US007286126B2

(12) United States Patent
Kim et al.

(10) Patent No.: US 7,286,126 B2
(45) Date of Patent: Oct. 23, 2007

(54) APPARATUS FOR AND METHOD OF PROCESSING DISPLAY SIGNAL

(75) Inventors: Young-chan Kim, Ulwang-si (KR); Jae-hyung Chang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 603 days.

(21) Appl. No.: 10/842,438

(22) Filed: May 11, 2004

(65) Prior Publication Data

US 2005/0052440 A1 Mar. 10, 2005

(30) Foreign Application Priority Data

Aug. 22, 2003 (KR) ..................... 10-2003-0058244

(51) Int. Cl.
*G06F 3/038* (2006.01)

(52) U.S. Cl. ........................ 345/211; 345/204; 345/212

(58) Field of Classification Search ........ 345/211-213, 345/660, 204
See application file for complete search history.

(56) References Cited

U.S. PATENT DOCUMENTS 6,538,648 B1 * 3/2003 Koike et al. ................ 345/213
6,597,370 B1 * 7/2003 Lee ............................ 345/660
6,778,170 B1 * 8/2004 Shu et al. ................... 345/213
6,989,827 B2 * 1/2006 Myers ........................ 345/204
7,193,600 B2 * 3/2007 Onishi et al. ................ 345/99
2001/0017666 A1 8/2001 Sani et al.
2001/0048432 A1 * 12/2001 Taniai et al. ................ 345/213
2005/0057551 A1 * 3/2005 Gong et al. ................. 345/211

FOREIGN PATENT DOCUMENTS

KR 20-200370 8/2000
KR 2001-81229 8/2001

* cited by examiner

*Primary Examiner*—Richard Hjerpe
*Assistant Examiner*—Kimnhung Nguyen
(74) *Attorney, Agent, or Firm*—Staas & Halsey LLP

(57) ABSTRACT

An apparatus for processing a display signal in a display device, the apparatus including a sampling clock sampling data set by a control signal, an analog-to-digital converter converting analog R, G, and B signals into digital image data according to the sampling clock, a data enable signal generating portion determining the start and end of valid data output from the analog-to-digital converter and generating a data enable signal, a scaler converting the digital image data output from the analog-to-digital converter into signals for a predetermined resolution, wherein the scaler is synchronized with the data enable signal generated by the data enable signal generating portion, a phase locked loop portion providing the sampling clock to the analog-to-digital converter and the data enable signal generating portion, and a control portion providing the control signal to the phase locked loop portion and controlling the data phase of the scaler.

17 Claims, 3 Drawing Sheets

FIG. 2
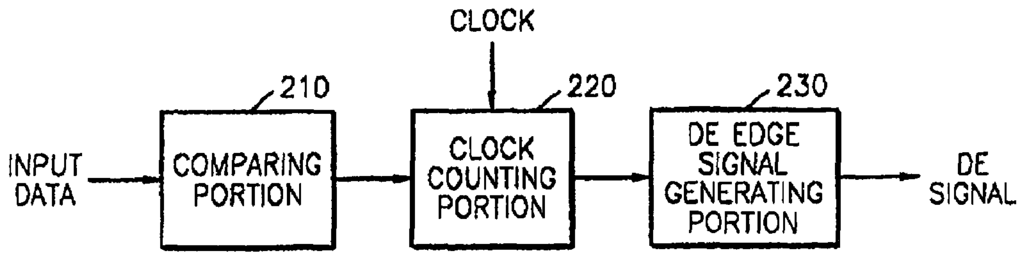
FIG. 3A
FIG. 3B
FIG. 3C
FIG. 3D
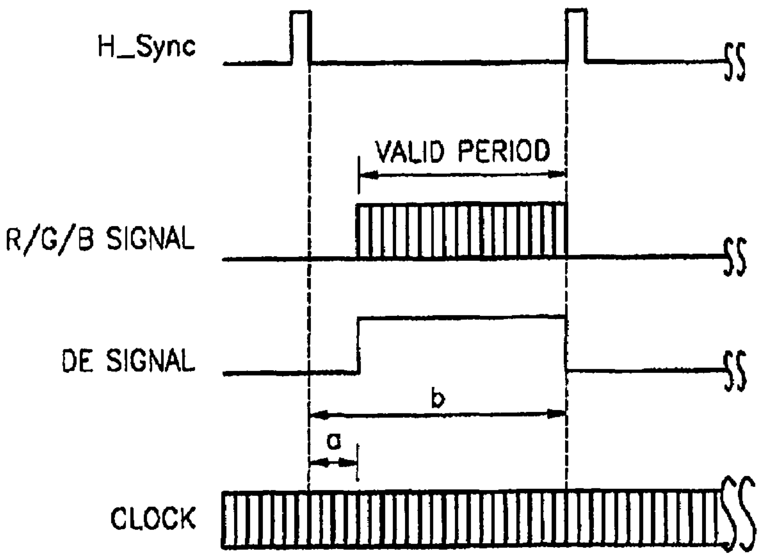

APPARATUS FOR AND METHOD OF PROCESSING DISPLAY SIGNAL

CROSS-REFERENCE TO RELATED APPLICATIONS

This application claims the priority of Korean Patent Application No. 2003-58244, filed on Aug. 22, 2003, in the Korean Intellectual Property Office, the disclosure of which is hereby incorporated herein by reference.

BACKGROUND OF THE INVENTION

1. Field of the Invention

The invention relates to a display system such as a liquid crystal display (LCD) monitor, and more particularly, to an apparatus for and a method of processing a display signal, wherein a data enable (DE) signal is produced from an analog image signal.

2. Description of the Related Art

LCD devices, developed as a substitute for cathode ray tubes (CRT) counterparts, have advantageous features such as a compact and lightweight design and low power consumption. As a result, LCD devices have been widely used as bulk-data display devices as well as in laptop computers and desktop computers.

Typically, graphic cards are installed in computers. The graphic cards output analog signals or digital signals. LCD devices use as their signal sources the analog signals and the digital signals output from the graphic cards. Here, each of the analog signals consists of a horizontal (H) synchronization signal, a vertical (V) synchronization signal, and R, G, and B analog signals. Also, each of the digital signals consists of a data enable (DE) signal, the H synchronization signal, the V synchronization signal, and R, G, and B data. The analog signals are converted into the digital signals by an analog-to-digital converter (ADC). The ADC is manually adjusted by users or automatically adjusted, thus outputting the digital signals as optimal values to a display device. In other words, the LCD devices obtain accurate sampling frequencies and sampling phases of input signals using display driving S/W programs (a rough adjustment and a fine adjustment) and set a start point of sampling (a position adjustment). Such an auto adjustment is performed by a user's manipulation of an on screen display (OSD) or by the use of hot keys.

However, the auto adjustment is complex and difficult to implement. Also, many code sizes have to be used to implement the auto adjustment.

SUMMARY OF THE INVENTION

The invention provides an apparatus for and a method of processing a display signal, in which a data enable (DE) signal is produced from an analog signal, so that an auto adjustment algorithm for analog signals is implemented as hardware.

According to one embodiment of the invention, there is provided an apparatus for processing a display signal in a display device. The apparatus comprises an analog-to-digital converter, a data enable signal generating portion, a scaler, a phase locked loop (PLL) portion, and a control portion. The analog-to-digital converter converts analog R, G, and B signals into digital R, G, and B image data according to a sampling clock that is set by a control signal. The data enable signal generating portion determines the start and end of valid data output from the analog-to-digital converter and generates a data enable signal. The scaler converts the digital R, G, and B image data output from the analog-to-digital converter into signals that are suitable for a predetermined resolution, in synchronization with the data enable signal generated by the data enable signal generating portion. The PLL portion provides the sampling clock to the analog-to-digital converter and the data enable signal generating portion. The control portion provides the control signal to the PLL portion and controls the data phase of the scaler according to the data enable signal generated by the data enable signal generating portion.

According to another embodiment of the invention, there is provided a method of processing a display signal. The method comprises setting a default sampling clock, based on an input horizontal synchronization signal and an input vertical synchronization signal, converting analog R, G, and B signals transmitted by a video card into digital R, G, and B image data according to the default sampling clock, setting as a rising edge of a data enable signal the number of sampling clocks that is counted when a level of the digital R, G, and B image data is greater than a threshold value and setting as a falling edge of the data enable signal the number of sampling clocks that is counted when the level of the digital R, G, and B image data is smaller than the threshold value, and detecting valid areas of the digital R, G, and B image data in synchronization with the data enable signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 2 is a block diagram of a data enable (DE) signal-generating portion;

FIGS. 3A-3D are timing diagrams for generating a data enable signal from the data enable signal generating portion.

DETAILED DESCRIPTION OF THE PREFERRED EMBODIMENTS

Figure 1:
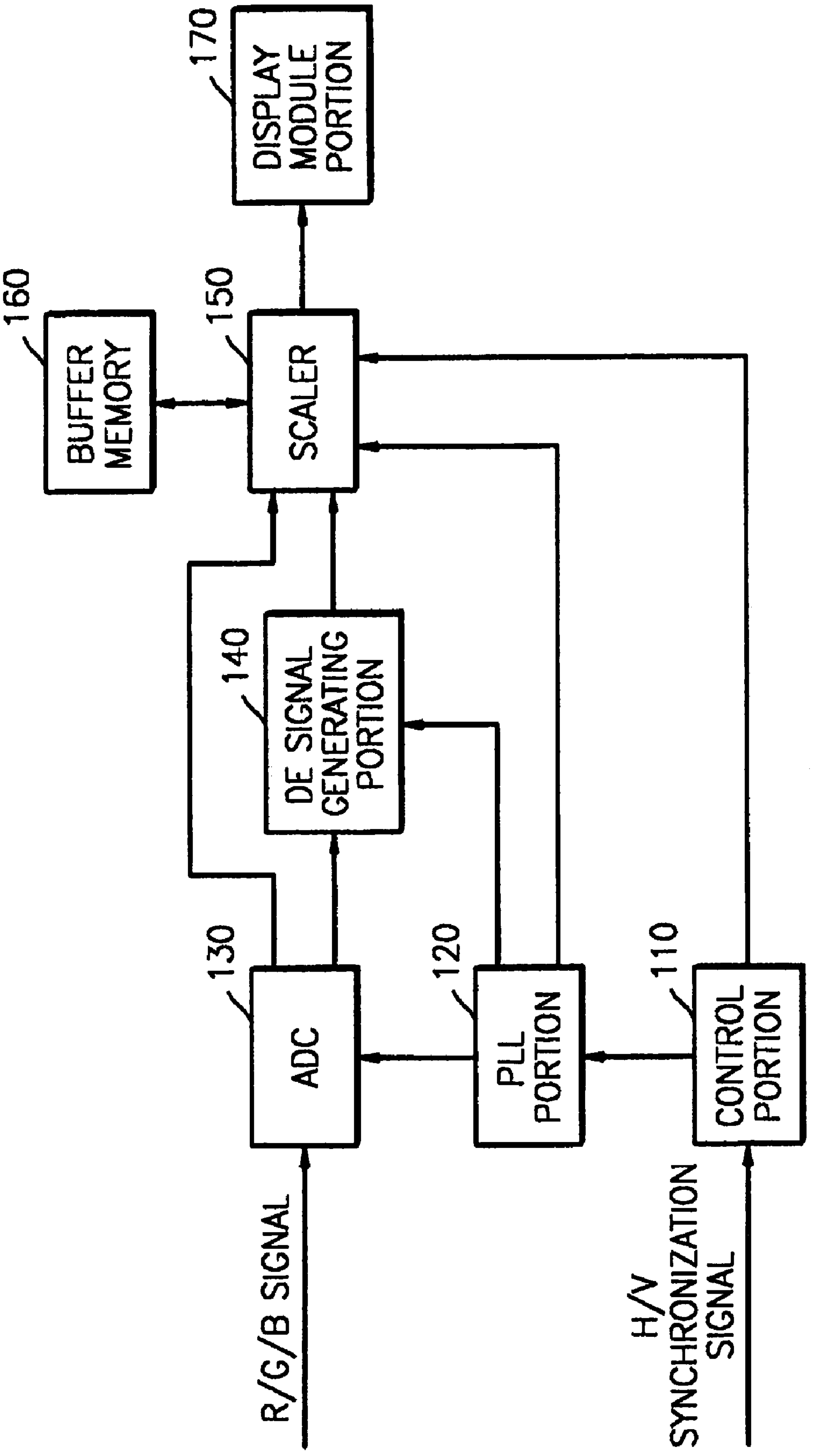
FIG. 1 is a block diagram of an apparatus for processing a display signal according to an embodiment of the invention.

Reference will now be made in detail to the embodiments of the present invention, wherein like reference numerals refer to the like elements throughout. The embodiments are described below to explain the present invention by referring to the figures.

FIG. 1 is a block diagram of an apparatus for processing a display signal, according to an embodiment of the invention.

Referring to FIG. 1, a control portion 110 identifies an image mode according to an H synchronization signal and a V synchronization signal that are transmitted from a video card (not shown) and outputs a control signal to make a signal processing operation perform according to the identified image mode.

A phase locked loop (PLL) portion 120 generates a sampling clock pulse according to the control signal output from the control portion 110.

An ADC 130 samples analog R, G, and B image signals received from the video card according to the sampling clock pulse provided from the PLL portion 120 and converts the analog R, G, and B image signals into digital R, G, and B image data.

A DE signal generating portion 140 generates a DE signal determining the start and end of valid data from the digital R, G, and B image data output from the ADC 130. The start and end of valid data determine rising and falling edges of the DE signal.

A scaler 150 controls a frame unit size of the digital R, G, and B image data output from the ADC 130, according to the sampling clock pulse provided from the PLL portion 120 and the control signal output from the control portion 110. At this time, the scaler 150 detects valid areas of the digital R, G, and B image data output from the ADC 130, in synchronization with the DE signal output from the DE signal generating portion 140.

A buffer memory 160 stores the digital R, G, and B image data output from the scaler 150 in at least one frame unit.

A display module portion 170 displays the R, G, and B image data that are stored in the buffer memory 160 in at least one frame unit.

FIG. 2 is a detailed view of the DE signal generating portion 140.

Referring to FIG. 2, a comparing portion 210 compares a level of input data that is output from the ADC 130 with a threshold value.

A clock counting portion 220 counts the number of sampling clocks when the level of the input data is greater or smaller than the threshold value.

An enable edge signal generating portion 230 generates the rising edge of the DE signal corresponding to the start of valid data and the falling edge of the DE signal corresponding to the end of valid data, based on the number of sampling clocks counted by the clock counting portion 220.

FIGS. 3A-3D are timing diagrams for generating the DE signal according to the invention.

Referring to FIGS. 3A-3D, R, G, and B signals are generated in synchronization with the H synchronization signal. At this time, the R, G, and B signals can be divided into a blank period and a valid period. The DE signal determines the start and end of the valid period of the R, G, and B signals.

Figure 4:
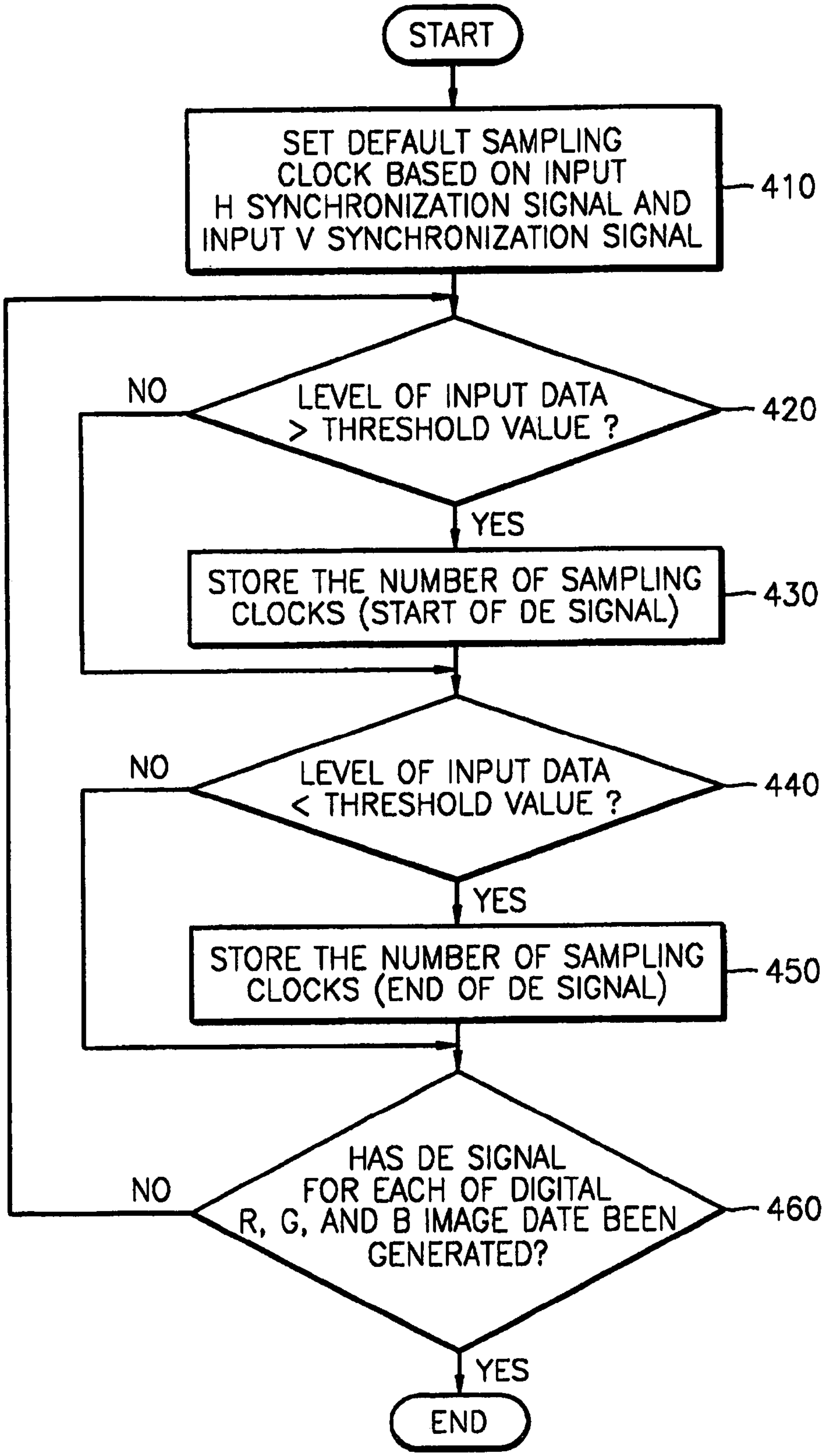
FIG. 4 is a flowchart describing a method of generating the data enable signal.

FIG. 4 is a flowchart describing a method of generating the DE signal according to the invention.

In the first operation 410, a default sampling clock is set based on an input H synchronization signal and an input V synchronization signal.

In operation 415, analog R, G, and B signals transmitted from a video card are converted into digital R, G, and B image data according to the sampling clock.

In operation 430, when the level of the digital R, G, and B image data is greater than a threshold value, the number of sampling clocks is stored and the stored number of sampling clocks is set as a rising edge of a DE signal. Referring to FIGS. 3A-3D, the number of sampling clocks, which are counted from when the H synchronization signal is generated to when the level of valid data starts (during a period indicated by 'a'), is stored and the stored number of clocks is set as the rising edge of the DE signal.

In operation 450, when the level of the digital R, G, and B image data is smaller than the threshold value, the number of sampling clocks is stored and the stored number of sampling clocks is set as a falling edge of the DE signal. Referring to FIGS. 3A-3D, the number of sampling clocks, which are counted from when the H synchronization signal is generated to when the level of valid data ends (during a period indicated by 'b'), is stored and the stored number of clocks is set as the falling edge of the DE signal.

In operation 460, the above operations repeat until a DE signal for each of the digital R, G, and B image data is generated.

As such, by comparing input data with a threshold value, a rising edge of a digital DE signal corresponding to the start of valid data and a falling edge of the digital DE signal corresponding to the end of valid data are determined.

As described above, according to the invention, by generating a DE signal from an analog signal input to a display device such as an LCD monitor, there is no need for auto-adjustment software for additional position and phase adjustments for analog signals.

While the invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for processing a display signal in a display device, the apparatus comprising:

an analog-to-digital converter converting analog R, G, and B signals into digital R, G, and B image data according to sampling clocks;

a data enable signal generating portion determining a start and an end of valid data output from the analog-to-digital converter and generating a data enable signal;

a scaler converting the digital R, G, and B image data output from the analog-to-digital converter into signals for a predetermined resolution wherein the scaler is synchronized, with the data enable signal generated by the data enable signal generating portion;

a phase locked loop portion providing the sampling clocks to the analog-to-digital converter and the data enable signal generating portion; and a control portion providing the control signal to the phase locked loop portion and controlling the data phase of the scaler according to the data enable signal generated by the data enable signal generating portion, wherein the data enable signal generating portion comprises:

a comparing portion comparing a level of input data output from the analog-to-digital converter with a threshold value, a clock counting portion counting a number of sampling clocks when a level of the input data is greater or smaller than the threshold value, and a data enable edge signal generating portion generating a rising edge of the data enable signal corresponding to the start of the valid data and a falling edge of the data enable signal corresponding to the end of the valid data, based on the counted number of sampling clocks.

2. The apparatus of claim 1, wherein the data enable edge signal generating portion sets as the rising edge of the data enable signal the counted number of sampling clocks that are counted when the level of the input data is greater than the threshold value and sets as the falling edge of the data enable signal the counted number of sampling clocks that are counted when the level of the input data is smaller than the threshold value.

3. An apparatus for processing a display signal in which an analog-to-digital converter is automatically adjusted, comprising:

a data enable signal generator receiving digital data and generating a data enable signal to determine a start and an end of valid data;

a phase locked loop unit providing sampling clocks to the analog-to-digital converter and the data enable signal generator; and a scaler controlling a frame size of the digital data output according to a pulse of the sampling clocks and a control signal and detecting valid data of the digital data output synchronously with the data enable signal generator output, wherein the data enable signal generator comprises:

a comparing portion comparing a level of input data that is output from the analog-to-digital converter with a threshold value, a clock counting portion counting a number of sampling clocks when the level of input data is greater or smaller than the threshold value, and a data enable edge signal generating portion generating a rising edge of the data enable signal corresponding to the start of valid data and a falling edge of the data enable signal corresponding to the end of valid data, based on the counted number of sampling clocks.

4. The apparatus of claim 3, further comprising a control unit identifying an image mode according to a horizontal synchronization signal and a vertical synchronization signal transmitted from a graphic adaptor and outputting a control signal to make a signal processing operation perform according to an identified image mode.

5. The apparatus of claim 4, wherein the graphic adaptor is a video card.

6. The apparatus of claim 4, further comprising a buffer memory storing the digital data output from the scaler in at least one frame unit.

7. The apparatus of claim 6, further comprising a display module displaying the digital data stored in the buffer memory.

8. The apparatus of claim 7, wherein the digital data comprises R, G, and B image data.

9. A method of processing a display signal, comprising:

setting a default sampling clock corresponding to a horizontal synchronization signal and a vertical synchronization signal;

transmitting analog signals transmitted from a graphic adaptor into digital data according to the default sampling clock; and counting a number of sampling clocks and setting a rising and a falling edge of a data enable signal according to the counted number of sampling clocks to detect valid areas of the digital data synchronously with the data enable signal, wherein the setting the rising and the falling edge of the data enable signal comprises storing the counted number of sampling clocks and setting the number of sampling clocks stored as the rising edge of the digital data signal when a level of the digital data exceeds a threshold level, and storing the counted number of sampling clocks and setting the number of sampling clocks stored as the falling edge of the data enable signal when the level of the digital data is smaller than the threshold value.

10. The method of claim 9 wherein the storing the counted number of sampling clocks and setting the stored number of sampling clocks as the rising edge comprises counting the number of sampling clocks beginning when the horizontal synchronization signal is generated to when the level of valid data starts.

11. The method of claim 10, wherein the storing the counted number of sampling clocks and setting the stored number of sampling clocks as the falling edge comprises counting the number of sampling clocks beginning when the horizontal synchronization signal is generated to when the level of valid data ends.

12. The method of claim 11, further comprising repeating the setting the default sampling clock, the transmitting analog signals transmitted from the graphic adaptor into digital data, and the setting the rising and the falling edge of the data enable signal to detect valid areas of the digital data synchronously with the data enable signal until the data enable signal is generated for each of the digital data.

13. A method of processing a display signal, comprising:

setting a default sampling clock corresponding to a horizontal synchronization signal and a vertical synchronization signal;

transmitting analog signals transmitted from a graphic adaptor into digital data according to the default sampling clock;

counting a number of sampling clocks and setting a rising and a falling edge of a data enable signal according to the counted number of sampling clocks to detect valid areas of the digital data synchronously with the data enable signal; and determining the rising edge of the data enable signal corresponding to the start of valid data and the falling edge of the digital data enable signal corresponding to the end of valid data by comparing input data with the threshold value.

14. A method of generating the data enable signal, comprising: setting a default sampling clock corresponding to a horizontal and a vertical input synchronization signal;

transmitting analog signals from a graphic adaptor and converting the analog signals into digital data according to the default sampling clock;

counting a number of sampling clocks and storing the number of sampling clocks counted to mark the start of the data enable signal when a level of input data exceeds a threshold value and to mark the end of the data enable signal when the level of input data is smaller than the threshold valve; and generating the data enable signal to determine a start and an end of valid data from the digital data, wherein the start and end of valid data determine a rising edge and a falling edge of the data enable signal.

15. The method of claim 14, further comprising controlling a frame size of the digital data according to a pulse of the sampling clock and detecting valid data of the analog signals converted to digital data synchronously with the data enable signal.

16. The method of claim 15, further comprising storing the frame size of digital data in a buffer memory to be displayed.

17. The method of claim 14, wherein the digital data comprises digital R, G, and B image data.

* * * * *

UNITED STATES PATENT AND TRADEMARK OFFICE

CERTIFICATE OF CORRECTION

PATENT NO. : 7,286,126 B2
APPLICATION NO. : 10/842438
DATED : October 23, 2007
INVENTOR(S) : Young-chan Kim et al.

It is certified that error appears in the above-identified patent and that said Letters Patent is hereby corrected as shown below:

Column 6, Line 4, change “claim 9” to --claim 9,--.

Column 6, Line 51, change “valve;” to --value;--.

Signed and Sealed this

Twenty-sixth Day of February, 2008

JON W. DUDAS
*Director of the United States Patent and Trademark Office*